United States Patent [19]

Robinson

[11] 4,212,675

[45] Jul. 15, 1980

[54] FIREPROOFING

[75] Inventor: Garnet Robinson, Weston-Super-Mare, England

[73] Assignee: Retroflame International Limited, Gloucestershire, England

[21] Appl. No.: 893,198

[22] Filed: Apr. 3, 1978

[51] Int. Cl.² .............................................. C09D 5/18
[52] U.S. Cl. .............................. 106/18.15; 106/18.16; 106/18.18; 106/18.2; 106/18.21; 106/18.23; 252/8.1; 162/159
[58] Field of Search ....................... 106/15 FP, 18.15; 252/8.1; 162/159; 428/920, 921, 276; 260/45.7, 45.7 P

[56] References Cited

U.S. PATENT DOCUMENTS

| | | | |
|---|---|---|---|
| 3,819,518 | 6/1974 | Endler | 428/921 |
| 4,005,034 | 1/1977 | Weil | 260/45.7 P |
| 4,054,720 | 10/1977 | Tomita et al. | 252/8.1 |
| 4,062,687 | 12/1977 | Mauric et al. | 260/45.7 P |

FOREIGN PATENT DOCUMENTS

| | | |
|---|---|---|
| A2411 | 1/1978 | Austria . |
| 1441185 | 6/1920 | United Kingdom . |
| 487702 | 6/1938 | United Kingdom . |
| 503136 | 3/1939 | United Kingdom . |
| 1330651 | 9/1973 | United Kingdom . |
| 49286 | 12/1975 | United Kingdom . |

Primary Examiner—Howard E. Schain
Assistant Examiner—W. Thompson
Attorney, Agent, or Firm—Oblon, Fisher, Spivak, McClelland & Maier

[57] ABSTRACT

A fireproofing composition comprising an aqueous solution of a fire-retardant water-soluble inorganic ammonium salt and a surface tension reducing amount of a surfactant selected from the group consisting of organic ester acids and ester salts of polyphosphoric acid wherein said ester acids are co-esters of an aliphatic alcohol and a nonionic adduct of ethylene oxide and a reactive-hydrogen-containing organic compound in which coesters less than all of the phosphate protons are consumed by the ester bonds.

28 Claims, 5 Drawing Figures

FIREPROOFING

The present invention relates to fireproofing compositions and has particular, but not exclusive, application to the fireproofing of porous (i.e. impregnatable) material, especially wood (including compressed wood fibre products such as hardboard). The term "fireproofing" as used in this Specification (including the Claims) means reduced inflammability and includes therefore flame-retarding and partial fireproofing.

It is well known to fireproof wood and other porous materials by impregnation with an aqueous solution of a wide variety of inorganic salts and subsequently allowing or causing the impregnated material to dry. In particular, ammonium salts such as ammonium bromide, ammonium chloride, ammonium sulphate, monoammonium phosphate, diammonium phosphate, ammonium alum and ammonium borate have been widely used alone and in various combinations for this purpose. Certain surfactants (i.e. wetting agents) have also been included in aqueous solutions of fire-retardant water-soluble inorganic salts. In particular, non-ionic long chain ethoxylate surfactants have been recommended for such use.

The known fireproofing compositions have not been entirely satisfactory in that it has been difficult to achieve consistently good fireproofing results with, for example, wood without using expensive materials and/or expensive processes. Generally, it has not been possible to fireproof wood in a commercially viable manner to meet the requirements of Class 0 material when subjected to the ignitability and fire propagation tests specified in British Standards 476: Part 5: 1968 and Part 6: 1968 as amended by AMD 549 July 1970. Said British Standard specifies the minium requirements of fireproofing for building materials to be used in public circulation areas such as in hotels, cinemas and theatres in England.

It is an object of this invention to provide an improved fireproofing composition which is capable of impregnating wood to said Class 0.

It is also an object of the invention to provide an improved fireproofing composition which is relatively inexpensive to manufacture and use.

It is a further object of the invention to provide an improved fireproofing composition which is capable of providing consistent fireproofing when used to impregnate porous material, especially wood.

It is another object of the invention to provide an improved impregnating process particularly suitable for impregnating porous material, especially wood, with a composition of the invention.

It is yet another object of the invention to provide an improved method of drying porous material impregnated with a composition of the invention.

I have found that a particularly effective fireproofing composition of the kind comprising an aqueous solution of a fire-retardant water-soluble inorganic ammonium salt and a surfactant is obtained when the surfactant is an organic polyphosphoric ester acid or a salt thereof, of the kind disclosed in U.S. Pat. No. 3,380,927. Said ester acids and salts are known surfactants having good dispersing, wetting and detergent properties but I understand that their use has previously been restricted to specialist applications such as dispersing clays, dyestuffs, pigments or resin-forming monomers. As far as I am aware there has never been any proposal or indication that they would be particularly suitable for use in fireproofing compositions.

According to the present invention therefore, there is provided a fireproofing composition comprising an aqueous solution of a fire-retardant water-soluble inorganic ammonium salt and a surface-tension reducing amount of an organic polyphosphoric ester acid or a salt thereof wherein said ester acids are coesters of an aliphatic alcohol and a non-ionic adduct of ethylene oxide and a reactive hydrogen-containing organic compound in which coesters less than all of the phosphate protons are consumed by ester bonds.

It is preferred that the said surfactant is the potassium salt of the ester acid and an especially preferred surfactant is the potassium salt of an organic polyphosphoric ester acid such as that sold under the Trade Mark "STRODEX PK-90" by Dexter Chemical Corporation. The precise identity of "STRODEX PK-90" is not known to me but a typical analysis provided by Wells Laboratories Inc. and published by Berk Limited is as follows:

Physical form—clear, free-flowing liquid
Colour—straw colour
Activity—90%
Moisture —10% by weight maximum
pH (1% solution)—6.9–7.3
Specific gravity (30° C.)—1.134 (9.46 lbs per gallon)

The amount of surfactant included in the composition will depend upon the precise identity of the surfactant but will be sufficient in all cases to ensure at least partial penetration of the material to be impregnated under the process conditions employed. The optimum amount for a particular surfactant can readily be determined by simple experiment. Usually, the amount will be in the range 0.25% to 2% (inclusive), especially 0.3% to 1% (inclusive), by volume. It appears that the preferred surface tension of the composition is in the range 25 to 30 (inclusive), especially 26 to 28 (inclusive), dynes per cm as measured on a Stalagometer.

Preferably, the inorganic fire-retardant ammonium salts used in the compositions of this invention are ammonium bromide, ammonium chloride, monoammonium phosphate, diammonium phosphate and mixtures thereof. A mixture of the said ammonium phosphates optionally with ammonium chloride is presently preferred. These and other fire-retardant water-soluble inorganic salts are well known per se for use in fireproofing compositions and hence the relative and absolute proportions thereof can readily be determined by those skilled in the art, if necessary after simple experiment, to provide a desired degree of fireproofing. These proportions will vary from one porous material to another depending upon inter alia porosity and inflammability of the material. Usually, however, the aqueous fireproofing compositions of the invention will contain 15% to 40% (inclusive) especially 20% to 30% (inclusive), by weight of the said inorganic salts.

When the compositions are to be employed for impregnating wood it is preferred that the specific gravity of the composition at room temperature should be in the range 1.07 to 1.17 (inclusive), especially 1.10 to 1.13 (inclusive). Further, it is also preferred that the composition should be substantially neutral, e.g. pH 7.0 to 7.2 (inclusive).

The performance of the compositions of the invention can be improved by the use of an inorganic ammonium salt which is soluble in a water-miscible polyalkylene glycol, especially, polyethylene glycol, and the inclusion of a proportion of the polyalkylene glycol in the composition sufficient to retard leaching by water of said salt from the impregnated material. Said proportion of polyalkylene glycol is referred to hereinafter as a "leach-retardant amount".

According to a preferred embodiment of the invention therefore, there is provided a fireproofing composition comprising an aqueous solution of a water-soluble inorganic ammonium salt which is also soluble in a water-miscible polyalkylene glycol, a surface-tension reducing amount of the organic polyphosphoric coester acid of the class previously defined or salt thereof, and a leach-retarding amount of said water-miscible polyalkylene glycol.

Usually, the polyalkylene glycol will be polyethylene glycol, especially one with a molecular weight in the range 1500 to 7000 (inclusive). The amount of polyalkylene glycol present in the composition will be sufficient to retard the leaching by water of the inorganic ammonium salt from a porous material impregnated with the aqueous solution and then dried. Conveniently, said amount will be in the range 2% to 10% (inclusive), especially 5% to 10% (inclusive) by weight of the composition and/or in the range 10% to 50% (inclusive), preferably 20% to 40% (inclusive), by weight based upon the weight of the inorganic ammonium salt.

The compositions of the invention are principally, but not exclusively, intended for impregnating wood (including compressed wood fibre products such as hardboard as well as laminated wood products such as plywood and artificial wood board such as chipboard and particle board). Any of the methods conventionally employed for impregnating wood with aqueous compositions can be used, especially the so-called "full-cell" process in which the wood is subjected to the aqueous composition under pressure.

In conventional modern "full-cell" processes, the wood is placed in a pressure vessel and a preliminary vacuum (i.e. subatmospheric pressure) is applied. This preliminary vacuum is usually 560 mm Hg gauge or lower and is applied for a period of from 15 to 60 minutes. The aqueous composition is then admitted to the vessel and subjected to a pressure, usually in the range 120 to 180 psig for from 1 to 6 hours depending upon the nature of the wood to be treated. Lower pressures of, for example, 10 to 30 psig, can be used in the case of particle board and other synthetic board materials. The pressure is released and the vessel is drained of liquid and a final vacuum of, for example, 500 mm Hg gauge or lower applied for a short period of, for example, 15 to 45 minutes. It is generally believed that high pressures are desirable for efficacious operation of the "full-cell" process and hence that it is advantageous to use pressures approaching the compressive strength of the wood. Pressures of up to 1000 psig have been used in Australia to impregnate native timbers (see Wood Preservation Leaflet, British Wood Preserving Association 1973). However, I have now found that, at least when using the compositions of the present invention, it is possible to satisfactorily impregnate wood in a "full-cell"-type method without the need to apply superatmospheric pressure if the initial partial vacuum is continued during contacting of the wood with the composition.

According to another preferred embodiment of the present invention therefore, there is provided a method of impregnating porous material, especially wood, which comprises locating the material to be impregnated in a vessel, reducing the pressure in the vessel to a partial vacuum, maintaining a partial vacuum in the vessel whilst introducing an aqueous fireproofing composition of the invention to immerse said material and for a sufficient time thereafter to at least partially impregnate said material with said composition.

Suitably gas is drawn from the vessel to produce the partial vacuum only during the initial evacuation and subsequent flooding (i.e. introduction of the aqueous composition of the invention) and the vessel is sealed when flooded to the desired level to maintain the partial vacuum. Usually, the partial vacuum will be in the range 10 to 35 (inclusive) inches Hg, especially 25 to 30 (inclusive) inches Hg, vacuum gauge and will be maintained for 5 to 20 minutes after flooding (i.e. immersion). However, other vacuums and times can be employed if desired for particular applications. The optimum conditions will vary having regard to the nature and bulk of the material to be treated and of the composition employed. These conditions can be determined by simple experiment. In the case of a preferred composition comprising 24% by weight of a mixture of monoammonium and diammonium phosphates, 5% by weight polyethylene glycol, 1% by volume Tinapal fluorescent dye and 0.5% by volume STRODEX PK-90, it has been found that, at a partial vacuum of 29 inch Hg, plywoods and chipboards require about 5 minutes immersion for substantially total impregnation whilst hardboards require about 10 minutes immersion to obtain that level of impregnation.

The vessel in which the material is treated should not normally be completely filled with porous material because it is usually only partially flooded to, typically 85 to 90% to permit a gas space to which the partial vacuum is applied. Unless provision is made to rotate the vessel or otherwise circulate the liquid therein, only submerged material in the vessel will be properly impregnated. It is also highly desirable to ensure that the porous material is so loaded in the vessel that the liquid can pass freely between the boards or other pieces of said material and thereby facilitate short immersion periods. Such loading is well known per se and conventionally practised in the "full-cell" impregnation processes.

Advantageously, a gas is caused or allowed to pass through the impregnating composition after the material has been immersed for the desired period to disturb the material. Said gas, usually air, conveniently can release the vacuum in the vessel.

The impregnated material obtained from the preferred method described above or from any other suitable impregnation method can be dried by any of the drying methods conventionally employed to dry material impregnated with aqueous compositions. However, the drying of wood impregnated with aqueous compositions is usually a lengthy and/or costly procedure which will often determine the capacity of a plant for impregnating wood. Advances in drying wood have not produced an efficient and relatively rapid method compatible with the improvements afforded by the composition and impregnation method aspects of the present invention.

It has been proposed to season wood by arranging the wood in stacks disposed in a row in a kiln with one or more heater-dehumidifiers such as Drymatic timber seasoners (manufactured by Westair Dynamics Limited) disposed on one side of the row and to circulate heated air through the stacks in a direction transversely of the row and through the dehumidifier(s). I have now found that a significant increase in drying efficiency can be obtained by circulating the heated air longitudinally of the row with the dehumidifier(s) resited to be disposed in said air flow. In this manner the drying period required for a given quantity of wood and a given power consumption can be reduced by up to two-thirds compared with the previously proposed transverse air flow. In certain cases, it is even unnecessary to heat the air.

According to another preferred embodiment of the present invention therefore, there is provided a method of drying porous material impregnated with a fireproofing composition of the invention, which drying method comprises stacking the materials in a row of stacks, circulating air through the stacks in a direction longitudinally of the row and dehumidifying the air at least once during each cycle thereof. Usually, the circulating air will be heated at least for an initial period of drying. Suitably, the air is circulated through the stacks in one direction only and is returned from the downstream end of the row to the upstream end of the row by a return conduit spaced from said row.

Usually, the material to be dried will be stacked with a vertical space of, for example, 15 to 30 mm between each layer of the stack to facilitate passage of air through the stack. In the case of veneered wood, it is preferred that the pieces are arranged in pairs with their veneers facing to avoid damage during drying. Any number of stacks may be arranged in a row and the dehumidifying means, heating means if any and air circulation means will be disposed having regard to the length of the row. For example, each of said means suitably is disposed every 20 to 35 ft. in the row. It is preferred however that the drying should take place in a purpose-built housing in which the said means are located in a return conduit connecting the downstream and upstream ends of the row and spaced from, especially above, said row.

The heating means may include or be constituted by refrigerant condensation coil(s) of the dehumidifier means as is already known for wood drying. Additional heaters can be provided to boost the temperature of the circulating air when desired, especially during the initial drying stage. When drying wood, it is preferred that the initial temperature should be in the range of 70° to 80° F. for a few hours, e.g. 4 or 5 hours and then 50° to 70° F. for the remainder of the drying period, e.g. 2 to 5 days.

The air circulating means suitably can include or consist of one or more fans which preferably are disposed immediately downstream of the row.

The method will usually be carried out in a heat-insulated housing to reduce heat losses to the ambient environment.

I have also found that relatively efficient and inexpensive drying of wood can be achieved without the need to recirculate the air by dehumidifying air before contact with the wood and passing the resultant dehumidified air through the wood only once. This applies also to the prior art arrangement referred to in which the air circulates transversely of the row.

According to another embodiment of the invention therefore, there is provided a method of drying porous material impregnated with a fireproofing composition of the invention, which drying method comprises stacking the material in a row of stacks and passing only once therethrough a stream of dehumidified air, which substantially is vented to atmosphere. It will be appreciated that the stream of air is dehumidified before contact with the wood and is not recirculated but is continuously drawn from atmosphere.

The air can be passed through the stacks in a direction transverse of the row but it is preferred that it is passed longitudinally of the row. Desirably, the dehumidified air is heated by, for example, the dehumidifier itself, to a temperature usually not exceeding 60° F. and, for example, in warm ambient conditions, heating may be unnecessary.

The air suitably can be drawn through the stacks by at least one fan mounted downstream of the stacks and, preferably at least one further fan interposed between the dehumidifier and the stack.

As mentioned previously, the drying aspects of the invention are particularly intended for the drying of wood but it will be apparent that they can be adopted for drying of other porous material, for example, cardboard, impregnated with fireproofing compositions of the invention.

The following Examples illustrate fireproofing compositions in accordance with the present invention. In each case the solutions were prepared by adding the inorganic salts to tap water and stirring until said salts dissolved. The surfactant was then added followed by the dye and/or polyethylene glycol if present in the composition. Other orders of addition of the ingredients to water can be adopted if desired. If necessary the pH was adjusted to about 7.2. All percentages are solids contents by weight except in the case of Strodex where the percentage is by volume.

EXAMPLE 1

Ammonium Bromide: 20%
Hydrogen Diammonium Phosphate: 4%
Boric Acid: 4%
Strodex PK-90: 1%
Borax: 1%
Tinapal (fluorescent dye): 0.5%
Specific gravity (18°–20° C.): 1.17

EXAMPLE 2

Ammonium Bromide: 16%
Hydrogen Diammonium Phosphate: 8%
Strodex PK-90: 1%
Polyethylene glycol: 10%

EXAMPLE 3

Monoammonium and diammonium phosphates: 24%
Strodex PK-90: 0.5%
Polyethylene glycol: 5%
Tinapal: 0.5%

EXAMPLE 4

Monoammonium and diammonium phosphates: 24%
Polyethylene glycol: 5%
Tinapal: 1%
Strodex Pk-90: 0.5%

EXAMPLE 5

Ammonium Bromide: 10%
Hydrogen diammonium phosphate: 10%
Boric Acid: 10%
Strodex PK-90: 1%

EXAMPLE 6

Hydrogen diammonium phosphate: 20%

Boric Acid: 10%
Strodex PK-90: 1%

EXAMPLE 7

Hydrogen diammonium phosphate: 30%
Strodex PK-90: 1%

EXAMPLE 8

Ammonium Bromide: 10%
Boric Acid: 20%
Strodex PK-90: 1%

The composition of Example 1 can be diluted with water in a ratio of composition to water down to, for example, 2:3 depending upon the timber product to be treated. Generally hardwoods require higher solids contents and solids contents below 20% are intended for use with hardboard and chipboard.

The compositions of Examples 2, 3 and 4 are intended for all timber products, those of Examples 5, 6 and 7 are intended for use with hardboard, chipboard and interior quality plywoods, and that of Example 8 is intended for use with hardboard and chipboard.

Figure 1:
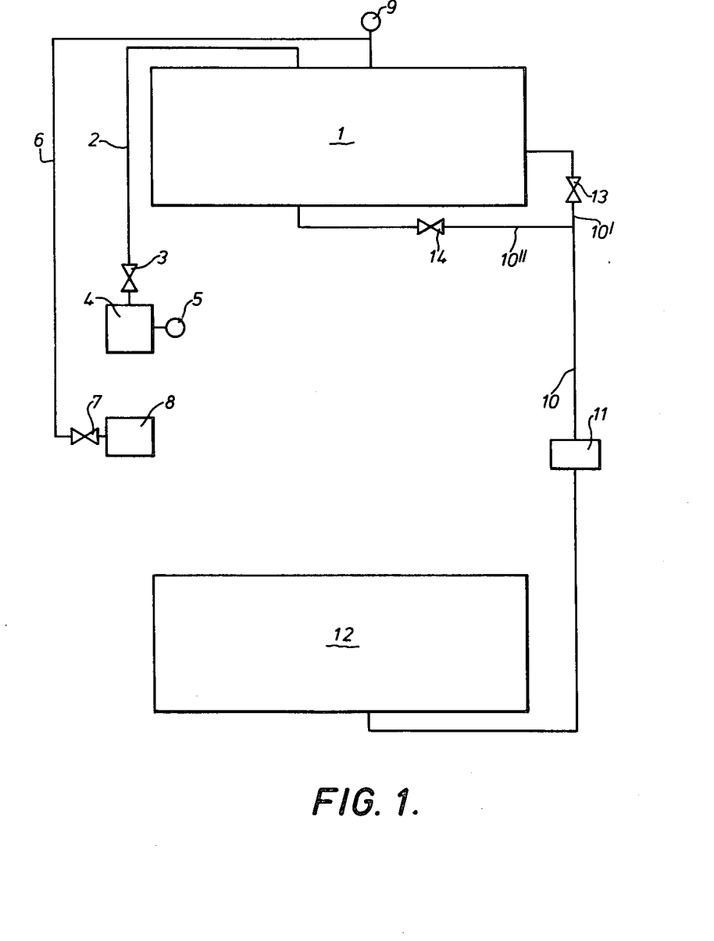

The compositions of Examples 1 to 8 can be employed to impregnate wood using the apparatus shown diagrammatically in FIG. 1 of the accompanying drawings.

Referring to FIG. 1, apparatus for impregnating hardboard or other impregnatable material, especially other wood, comprises a pressure vessel 1 of, for example, 22,000 gallon capacity. A vacuum line 2 extends from the top of vessel 1 via valve 3 to a vacuum pump 4 fitted with a vacuum gauge 5. A pressure line 6 also extends from the top of the vessel 1 via a valve 7 to a compressor 8 and a pressure gauge 9 is provided in said line immediately above the vessel 1. Liquid flow to the vessel 1 is provided by liquid flow line 10 extending via auxiliary pump 11 from liquid storage tank 12. Said line 10 bifurcates near vessel 1 into branches 10' and 10" which debouch into the back and bottom respectively of said vessel and includes valves 13, 14 respectively to control liquid flow to and from said vessel.

In use, the storage tank 12 is filled with the fireproofing composition and the vessel 1 is charged with a load of, for example, 300 cu.ft. of hardboard sheets of 4 mm thickness and evacuated to 29 inches Hg by pump 4. This vacuum is applied for about 5 minutes and then valve 3 is closed and valve 13, 14 opened to allow liquid to flow from tank 12 into vessel 1. Auxiliary pump 11 is used to supplement the vacuum pull on the liquid to fill the vessel 1. When vessel 1 is half full, the valve 14 is closed and when the vessel is full valve 13 is also closed and air pressure is applied by compressor 8 until a pressure of 10 psig is reached. Said pressure is maintained for about 10 minutes and the valves 13, 14 then opened to allow fluid to flow under said pressure back into tank 12, with assistance from pump 11. Valve 13 is closed when the liquid level in the vessel falls to half full and valve 14 when the vessel is empty of liquid and the vacuum is again applied to 29 inches Hg. That vacuum is maintained for about 5 minutes, released and the liquid drawn out of the hardboard (about 50 gallons) drawn off through pipe 10" back to tank 12. The vacuum of 29 inches Hg is again applied for 5 minutes, released and the liquid thus drawn out of the hardboard (about 20 gallons) drawn off to tank 12 via pipe 10".

The wet impregnated hardboard is withdrawn from the vessel 1 and dried in a dehumidified atmosphere.

The liquid in the storage tank 12 is replenished with about 100 gallons of the fireproofing composition and the treatment repeated on a second batch of hardboard.

Figure 2:
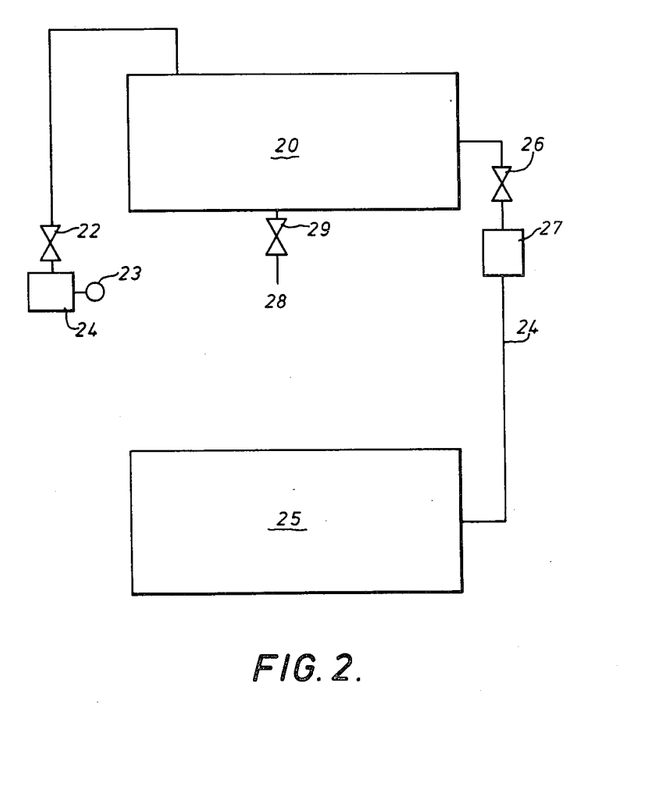

The compositions of Examples 1 to 8 can also be used to impregnate wood using the apparatus shown diagrammatically in FIG. 2 of the accompanying drawings.

Referring to FIG. 2, apparatus for impregnating, for example porous material in sheet form, comprises a pressure vessel 20 of, for example, 22,000 gallon capacity. A vacuum line 21 extends from the top of the vessel 20 via valve 22 to a vacuum pump 23 fitted with a vacuum gauge 23a. A fluid supply line 24 connects the vessel 20 with a liquid storage tank 25 and includes a valve 26 and a pump 27. An air supply line 28 including valve 29 connects the vessel 20 to a source of air, which can be atmosphere or if desired an air compressor.

In use, tank 25 is filled with the aqueous fireproofing composition. The vessel 20 is then charged with a load of, for example, 300 cu.ft. of hardboard sheets of 4 mm thickness and with valves 26 and 29 closed and valve 22 open is evacuated to 29 inches Hg. vacuum gauge by pump 4. This vacuum is applied for about 5 minutes and then valve 26 is opened and liquid is passed via line 24 into the vessel 20. If required the liquid flow is assisted by pump 27. When the vessel 20 is about ⅝ths flooded, valve 26 is closed. During this flooding stage, pump 23 continues to apply vacuum to the vessel 20 but shortly after closing valve 26 the valve 22 is also closed thereby sealing vessel 20 at a subatmospheric pressure of about 28 inches Hg. vacuum gauge. The vessel 20 is maintained in this sealed condition for about 10 minutes and then valve 29 is opened to allow air from line 28 to bubble through the liquid in the vessel in order to disturb the boards. When the vessel is at atmospheric pressure, or above if compressed air is supplied through line 28, valve 26 is opened and the fluid is pumped by pump 27 back into tank 25 for subsequent reuse.

The wet impregnated hardboard is withdrawn from vessels 1 or 20 and dried in a dehumidified atmosphere.

Figure 3:
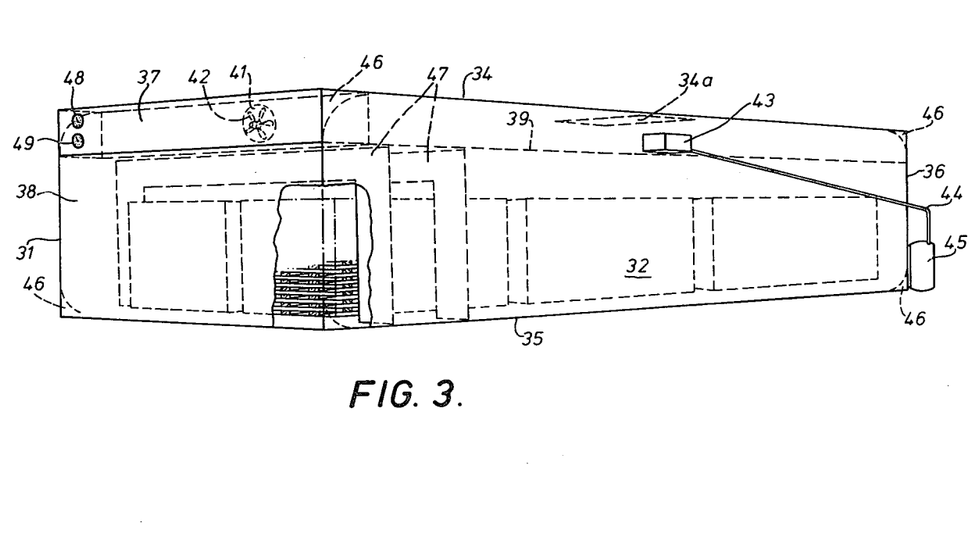

One method of drying wood impregnated by, for example, either of the methods described above with reference to FIGS. 1 and 2 is described below with reference to FIGS. 3 and 4. FIG. 3 is a front perspective view of apparatus for drying wood and FIG. 4 is a longitudinal cross-section of the apparatus of FIG. 3.

Figure 4:
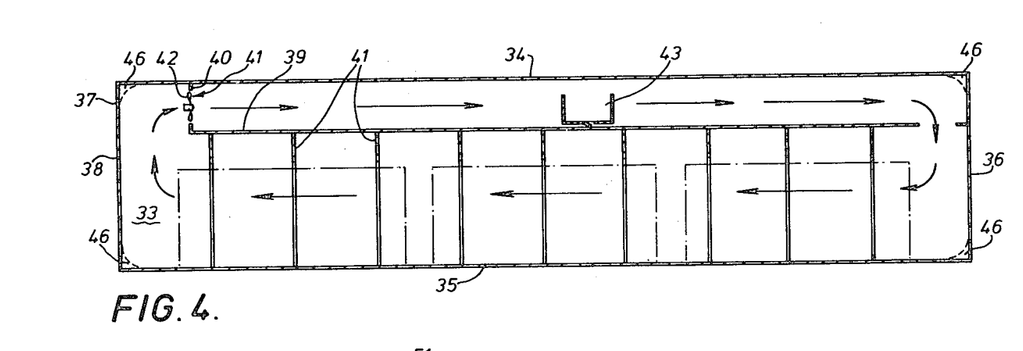

Referring to FIGS. 3 and 4, apparatus for drying wood comprises a housing 31 having spaced parallel rectangular side walls 32, 33 joined by top and bottom walls 34, 35 respectively. The rear end of the housing is closed in rear wall 36 whilst the front end is closed in a fixed upper panel 37 and a side hinged door 38. All of said walls, panel and door are heat insulated. For example, they are each formed of spaced wood panels or of wood lined with a heat insulating material.

A dividing wall 39 extends parallel to top wall 34 at the level of the base of front panel 37. This wall 39 extends between the side walls 32, 33 and substantially the length of the housing (as shown in FIG. 4). The front end of the conduit defined between walls 34 and 39 is closed in a panel 40 spaced rearwardly of panel 37. A plurality of orifices 41 (only one shown in the drawings) are provided in panel 40 and each has a high speed fan 42 mounted therein. One or more dehumidifiers 43 such as Westair Drymatic timber seasoner (manufactured by Westair Dynamics Limited) are located in the conduit between walls 34 and 39 towards the rear end thereof and the water outlet of the dehumidifier(s) is connected via a pipe 44 to a drum 45 externally of rear wall 36.

The front and rear corners of the housing 31 are covered internally by arcuate plates 46 to promote smooth air flow as indicated by the arrows in FIG. 4. A plurality of inverted "U"-shaped resiliently flexible shrouding members 47 depend from the wall 39 at equidistantly spaced points along its length.

The apparatus includes also a thermometer 48 and a hygrometer 49 to indicate temperature and humidity respectively. Further an inspection hatch 34a is provided in wall 34 immediately above the dehumidifier(s) 43.

In use, wood, for example hardboard, sheets impregnated with an aqueous fireproofing composition are stacked in spaced vertical relationship on spacers to provide 20 mm gaps between each layer of the stack. Several stacks are built up in this manner and then loaded through the door 38 into the housing 31. The stacks are spaced longitudinally in the housing so that each stack is engaged by one or more of the shrouding members 47. The relative dimensions of the stacks and members 47 are such that the members 47 engage both sides and the top of the respective stacks. The spacers are located so that longitudinal air flow through the gaps in each stack is not impeded and preferably the sheets are arranged with their grain in the longitudinal direction.

When the row of stacks has been located in the housing, the door 38 is closed and the fans 42 and dehumidifier(s) 43 actuated. An additional heater (not shown or built into the dehumidifier(s)) can also actuated so that the temperature in the housing reaches about 80° F. and this temperature is maintained for a period of about 4 hours. The additional heater is then turned off and the temperature maintained by the dehumidifier(s) at 60° to 70° F. for from 2 to 5 days until the sheets are dry. During said initial and main drying periods, the fans cause the air to circulate in the direction of the arrows of FIG. 4 whence the air passes longitudinally through the row of stacks and is dehumidified during each cycle. In this manner, the sheets are dried significantly more efficiently than is possible with any prior art method of which I am aware.

An alternative and presently less preferred method of drying wood impregnated by, for example, either of the methods described above with reference to FIGS. 1 and 2 is described below with reference to FIG. 5 which is a diagrammatic longitudinal section through an apparatus for drying wood.

Figure 5:
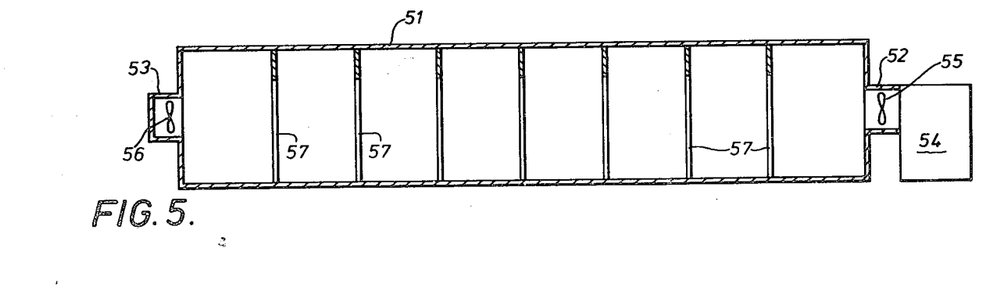

Referring to FIG. 5, an apparatus for drying wood comprises an elongate tubular housing 51 of substantially rectangular transverse cross-section and provided at respective ends with an air inlet 52 and an air outlet 53. The inlet 52 is supplied with dehumidified air from a dehumidifier 54 such as a Westair Drymatic timber seasoner (manufactured by Westair Dynamics Limited). An electrically driven fan 55 is provided in inlet 52 to draw air from the dehumidifier 54 into the housing 51. A similar fan 56 is provided in outlets 53 to assist the exhaust of air from the housing to atmosphere, to which the outlet 53 discharges the exhaust air.

A plurality of inverted "U"-shaped resiliently flexible shrouding members 57 depend from the roof of the housing 51 at equidistantly spaced intervals along its length.

In use, wood, for example hardboard, sheets impregnated with an aqueous fireproofing composition are stacked in spaced vertical relationship on spacers to provide 20 mm gaps between each layer of the stack. Several stacks are built up in this manner and are loaded into the housing 51 via a door (not shown) so that they are spaced longitudinally apart. Each stack is engaged by one or more shrouding members 57 and the relative dimensions of the stacks and members 57 are such that the members abut both the sides and the top of the respective stacks. The spacers are located so that longitudinal air flow through the gaps in each stack is not impeded and preferably the sheets are arranged with their grain in the longitudinal direction.

When the row of stacks has been located in the housing 51 the door through which they were loaded is closed and the fans 55, 56 and dehumidifier 54 are actuated. A heater built into the dehumidifier or other heating means can be provided to maintain the desired air temperature, which usually will not exceed 60° F. Fresh air from the ambient atmosphere is dehumidified in the dehumidifier 54 and drawn by fan 55 into the housing. The air passes through the stacks in a generally longitudinal direction and is drawn by fan 56 through the outlet 53 to be vented to atmosphere.

Air is passed through the housing 51 in the manner described above until the wood has dried to the desired moisture content (usually 2 to 5 days). In this manner, despite the fact that the air is not recirculated but is vented to atmosphere after only one pass through the housing, the wood is dried in an efficient manner.

Hardboard impregnated with a composition in accordance with any one of Examples 1 to 8 and in the manner specifically described above with reference to FIG. 1 or FIG. 2 and subsequently dried in a dehumidified atmosphere is thoroughly impregnated with the inorganic salt content of the compositions and can meet the requirements of Class O as previously defined. Similarly other wood products can also be fireproofed to said requirements using the same procedure although some variation in the relative amounts of the ingredients of the impregnating composition and in the process parameters may be required to compensate for differences in the density and nature of the wood. Nevertheless all kinds of wood can be fireproofed in this manner, including hardwoods, softwoods, plywood, chipboard, wood fibre board and particle board. When the polyethylene glycol-containing compositions were used, there was a significant decrease in the rate at which the inorganic salts were leached from the dried impregnated wood compared with the use of compositions which were identical except that the polyethylene glycol content was omitted.

From, U.S. Pat. No. 3,380,927, the composition of the Strodex PK-90 can be ascertained to be a coester of a $C_6$–$C_{16}$ aliphatic alcohol and a nonionic adduct of ethylene oxide and a reactive-hydrogen containing organic compound selected from the group consisting of $C_6$–$C_{18}$ alkylated phenols, $C_6$–$C_{25}$ aliphatic alcohols, and $C_6$–$C_{20}$ aliphatic monocarboxylic acids, amines or mercaptans; and wherein in said co-ester less than all of the orthophosphate protons are consumed by the ester bonds so that said coester contains at least one monohydrogen orthophosphate group or its salt.

The non-ionic adducts may be commercially available ones or may be made by conventional reaction of ethylene oxide with the organic compound containing active hydrogen atoms. Generally speaking, anywhere from 1 to 40 moles of ethylene oxide may be reacted per mole of organic compound. In making the phosphate co-ester, the weight proportions of the $C_6$–$C_{16}$ monohydric aliphatic alcohol and the non-ionic adduct may vary within the range of about 5 to 85 of the non-ionic adduct per 100 parts total of the mixture of the alcohol and the adduct. The molar ratio of the total number of mols combined of the $C_6$–$C_{16}$ monohydric alcohol and of the non-ionic adduct to the total number of mols of phosphoric acid or polyphosphoric acid, calculated as phosphorus pentoxide ($P_2O_5$) is within the range from about 1:1 to about 5:1.

In one test to assess the advantages of the presence of polyethylene glycol, samples of chipboard, hardboard, plywood and softwood were impregnated with compositions in accordance with one or more of Examples 2, 3 & 4 and compared with identical samples treated under the same conditions with compositions differing from the composition of the relevant Example only in so far as the polyethylene glycol content was omitted.

The impregnated samples were then dried and tested in accordance with British Standard 476 Part A. All samples reached the standard required in that test. Identical samples were subsequently stored under open cover for six months before testing. Those stored samples which had been impregnated with compositions not containing polyethylene glycol were found to have suffered an average loss of 15% in fire-retardant performance and 5% in solids content. In comparison, those stored samples which had been treated with compositions containing polyethylene glycol showed no significant loss in performance on solids content.

We understand from the manufacturers of Strodex PK-90 that the material is the potassium salt of a polyphosphate ester of conjointly an aliphatic alcohol and a reactive-hydrogen-containing organic compound. Said esters are known surface active agents and are described in U.S. Pat. No. 3,380,927 issued 30th Apr. 1968 to Dexter Chemical Corporation.

I claim:

1. A fireproofing composition containing an aqueous solution of a fire retardant water-soluble inorganic ammonium salt and a surface tension reducing amount of a surfactant selected from the group consisting of organic polyphosphoric ester-acids and salts thereof, wherein said ester acids are coesters of an aliphatic alcohol and a nonionic adduct of ethylene oxide and a reactive-hydrogen-containing organic compound in which coesters less than all of the phosphate protons are consumed by ester bonds.

2. The composition according to claim 1 wherein the said surfactant is a potassium salt of said organic polyphosphoric ester acid.

3. The composition according to claim 1 wherein the said surfactant is present in an amount in the range of 0.25% to 3% (inclusive) by volume of the composition.

4. The composition according to claim 3 wherein the said amount of surfactant is in the range 0.3% to 1% (inclusive) by volume.

5. The composition according to claim 1 wherein the surface tension of the composition is in the range 25 to 30 (inclusive) dynes per cm.

6. The composition according to claim 5 wherein the said surface tension is in the range 26 to 28 (inclusive) dynes per cm.

7. The composition according to claim 1 wherein the said ammonium salt is selected from the class consisting of ammonium bromide, ammonium chloride, monoammonium phosphate, diammonium phosphate and mixtures thereof.

8. The composition according to claim 1 wherein the said inorganic ammonium salt is present in an amount of 15% to 40% (inclusive) by weight of the composition.

9. The composition according to claim 8 wherein the said amount of inorganic ammonium salt is 20% to 30% (inclusive) by weight.

10. The composition according to claim 1 wherein the specific gravity of the composition at room temperature is in the range 1.07 to 1.17 (inclusive).

11. The composition according to claim 10 wherein the specific gravity is in the range 1.10 to 1.13 (inclusive).

12. The composition according to claim 1 wherein the composition is substantially neutral.

13. The composition according to claim 12 wherein the pH of the composition is in the range 7.0 to 7.2 (inclusive).

14. A fireproofing composition comprising an aqueous solution of a fire-retardant water soluble inorganic ammonium salt and a surfactant selected from the group consisting of organic polyphosphoric ester acids and salts thereof, wherein said ester acids are coesters of an aliphatic alcohol and a non-ionic adduct of ethylene oxide and a reactive-hydrogen-containing organic compound in which coesters less than all of the phosphate protons are consumed by ester bonds, the said inorganic ammonium salt constituting 15% to 40% (inclusive) by weight of the composition, the said surfactant constituting 0.25% to 3% (inclusive) by volume of the composition, and the composition having a surface tension in the range 25 to 30 (inclusive) dynes per cm and being substantially neutral.

15. The composition according to claim 14 wherein the amount of inorganic ammonium salt is 20% to 30% (inclusive) by weight, the amount of surfactant is 0.3% to 1% (inclusive) by volume and the composition has a surface tension in the range 26 to 28 (inclusive) dynes per cm and has a pH in the range 7.0 to 7.2 (inclusive).

16. A fireproofing composition according to claim 1 comprising an aqueous solution of a fire-retardant water soluble inorganic ammonium salt wherein said salt is also soluble in a water-miscible polyalkylene glycol and the aqueous solution of said salt and surfactant also comprises a leach-retarding amount of said water-miscible polyalkylene glycol.

17. The composition according to claim 16 wherein the polyalkylene glycol is a water-miscible polyethylene glycol.

18. The composition according to claim 17 wherein the polyethylene glycol has a molecular weight in the range 1500 to 7000 (inclusive).

19. The composition according to claim 16 wherein the amount of polyalkylene glycol is in the range 2% to 10% (inclusive) by weight of the composition.

20. The composition according to claim 19 wherein said amount of polyalkylene glycol is in the range 5% to 10% (inclusive) by weight of the composition.

21. The composition according to claim 16 wherein the amount of polyalkylene glycol is in the range 10% to 50% (inclusive) by weight based on the weight of the inorganic salt.

22. The composition according to claim 21 wherein the said amount of polyalkylene glycol is in the range 20% to 40% (inclusive) based upon the weight of the inorganic salt.

23. The composition according to claim 14 comprising also a leach retardant amount of a polyalkylene glycol which is water miscible and in which the inorganic salt is soluble.

24. A fireproofing composition comprising an aqueous solution of a fire-retardant water-soluble inorganic ammonium salt and a surface tension reducing amount of a surfactant selected from the group consisting of organic ester-acids and ester-salts of phosphoric or polyphosphoric acid, wherein said ester-acids or ester-salts are co-esters of a $C_6$–$C_{16}$ aliphatic alcohol and a nonionic adduct of ethylene-oxide and reactive-hydrogen-containing organic compounds selected from the group consisting of $C_6$–$C_{18}$ alkylated phenols, $C_6$–$C_{25}$ aliphatic alcohols, and $C_6$–$C_{20}$ aliphatic monocarboxylic acids, amines or mercaptans;

and wherein less than all of the phosphate protons are consumed by the ester bonds so that said co-esters contain at least one monohydrogen ortho phosphate group or its corresponding salt per molecule.

25. A fireproofing composition comprising an aqueous solution of a fire-retardant water soluble inorganic ammonium salt and a surfactant selected from the group consisting of organic ester acids and ester-salts of phosphoric or polyphosphoric acid, the said inorganic salt constituting 15% to 40% (inclusive) by weight of the composition, the said surfactant constituting 0.25% to 3% (inclusive) by volume of the composition, and the composition having a surface tension in the range 25 to 30 (inclusive) dynes per cm and being substantially neutral;

wherein said ester-acid or ester-salt is a co-ester of a $C_6$–$C_{16}$ aliphatic alcohol and a nonionic adduct of ethylene oxide and a reactive-hydrogen-containing organic compound selected from the group consisting of $C_6$–$C_{18}$ alkylated phenols, $C_6$–$C_{25}$ aliphatic alcohols, and $C_6$–$C_{20}$ aliphatic monocarboxylic acids, amines or mercaptans; and wherein in said co-ester less than all of the orthophosphate protons are consumed by the ester bonds so that said co-ester contains at least one monohydrogen orthophosphate gorup or its salt.

26. A fireproofing composition according to claim 24 wherein said ammonium salt is also soluble in a water-miscible polyalkylene glycol and wherein said composition also comprises a leach-retarding amount of said water-miscible polyalkylene glycol.

27. A fireproofing composition according to claim 24 wherein said nonionic adduct of ethylene oxide and said organic compound contains from 1 to 40 moles of ethylene oxide per mole of said reactive-hydrogen-containing organic compound and wherein said nonionic adduct is present in a weight proportion of about 5 to 85 parts per 100 parts combined of said nonionic adduct and said aliphatic $C_6$–$C_{16}$ alcohol.

28. The fireproofing composition of claim 24 wherein said $C_6$–$C_{16}$ aliphatic alcohol and said nonionic adduct combined are present within the range from about 1:1 to about 5:1 to the total number of moles of said phosphoric or polyphosphoric acid, calculated as phosphorous pentoxide.

* * * * *